March 8, 1932.   I. I. SIKORSKY   1,848,390
AIRCRAFT WING CONSTRUCTION
Filed Aug. 12, 1929   4 Sheets-Sheet 1
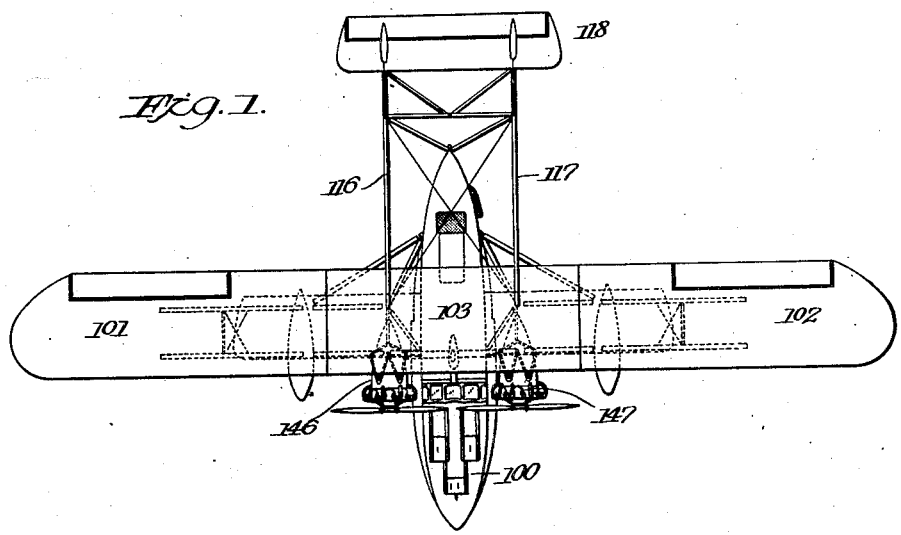
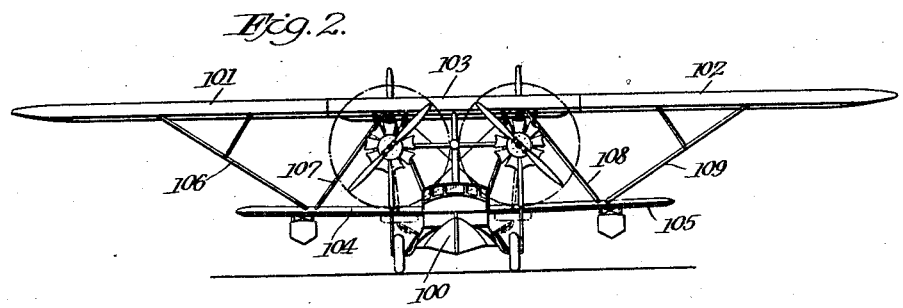
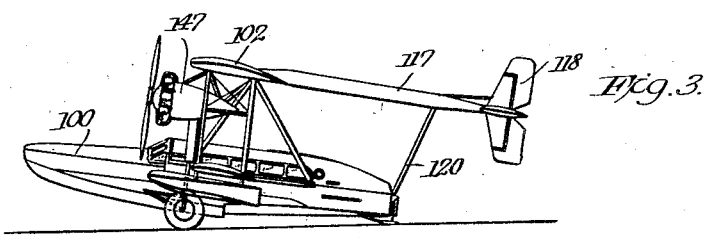
Igor I. Sikorsky
INVENTOR
BY
ATTORNEY

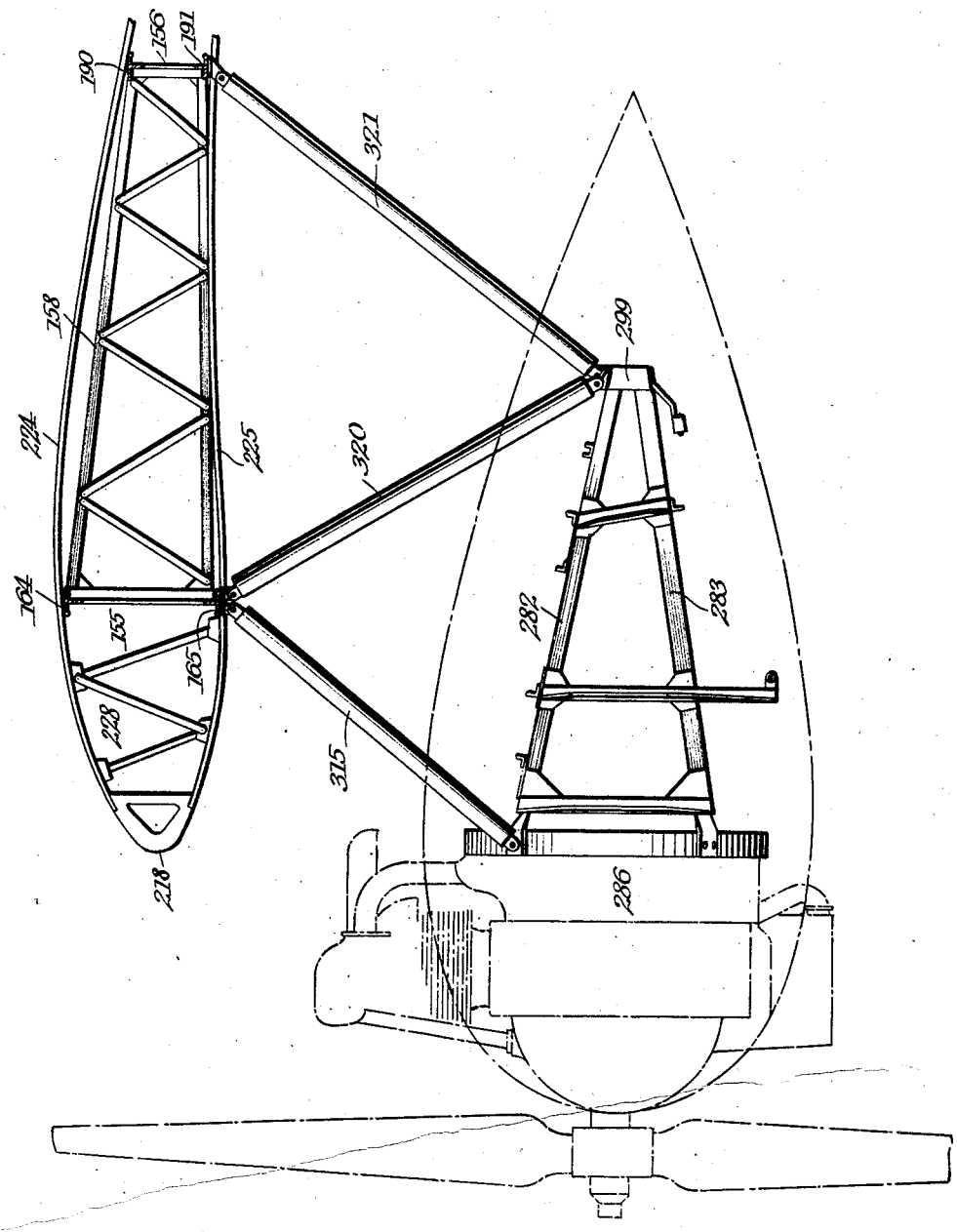

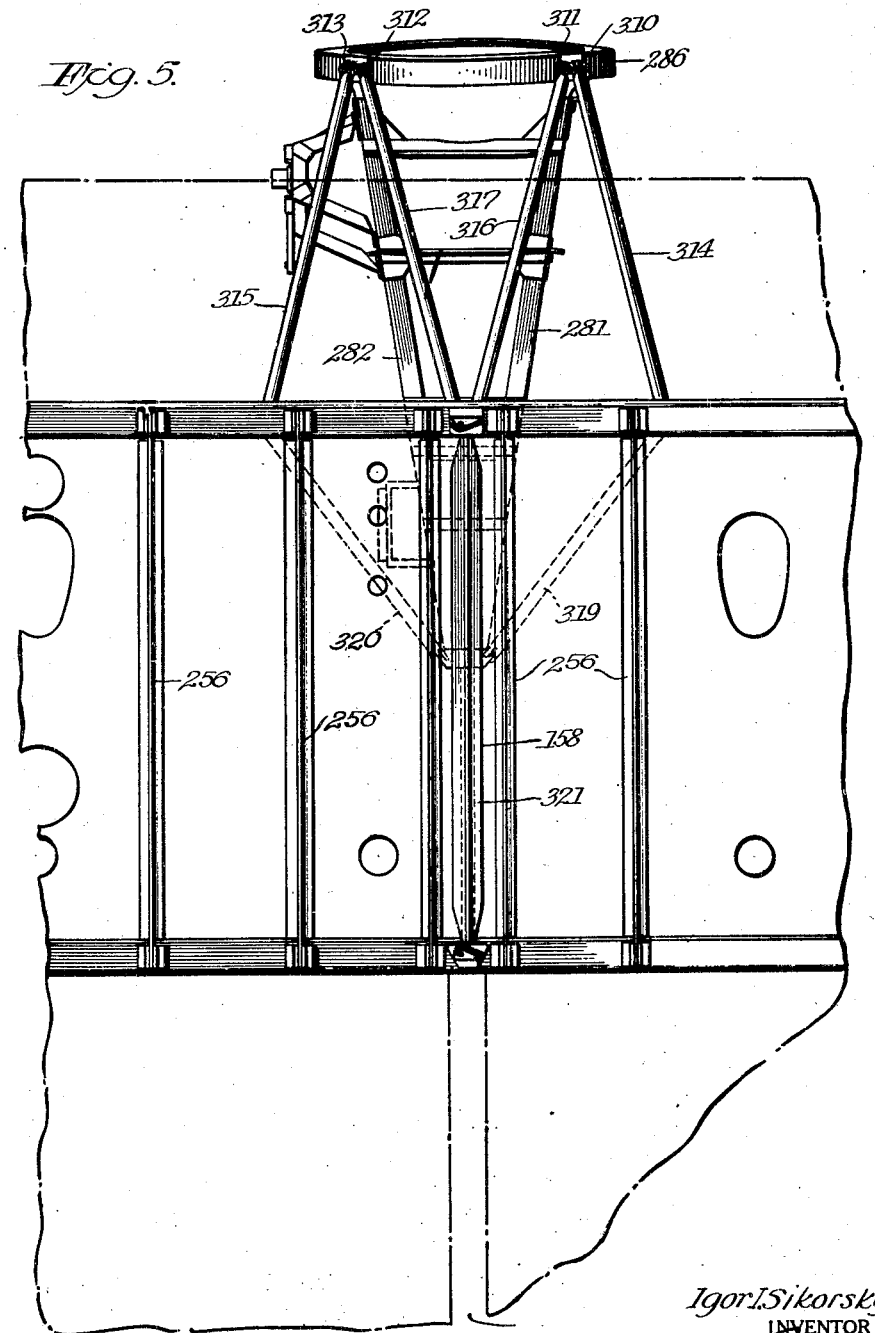

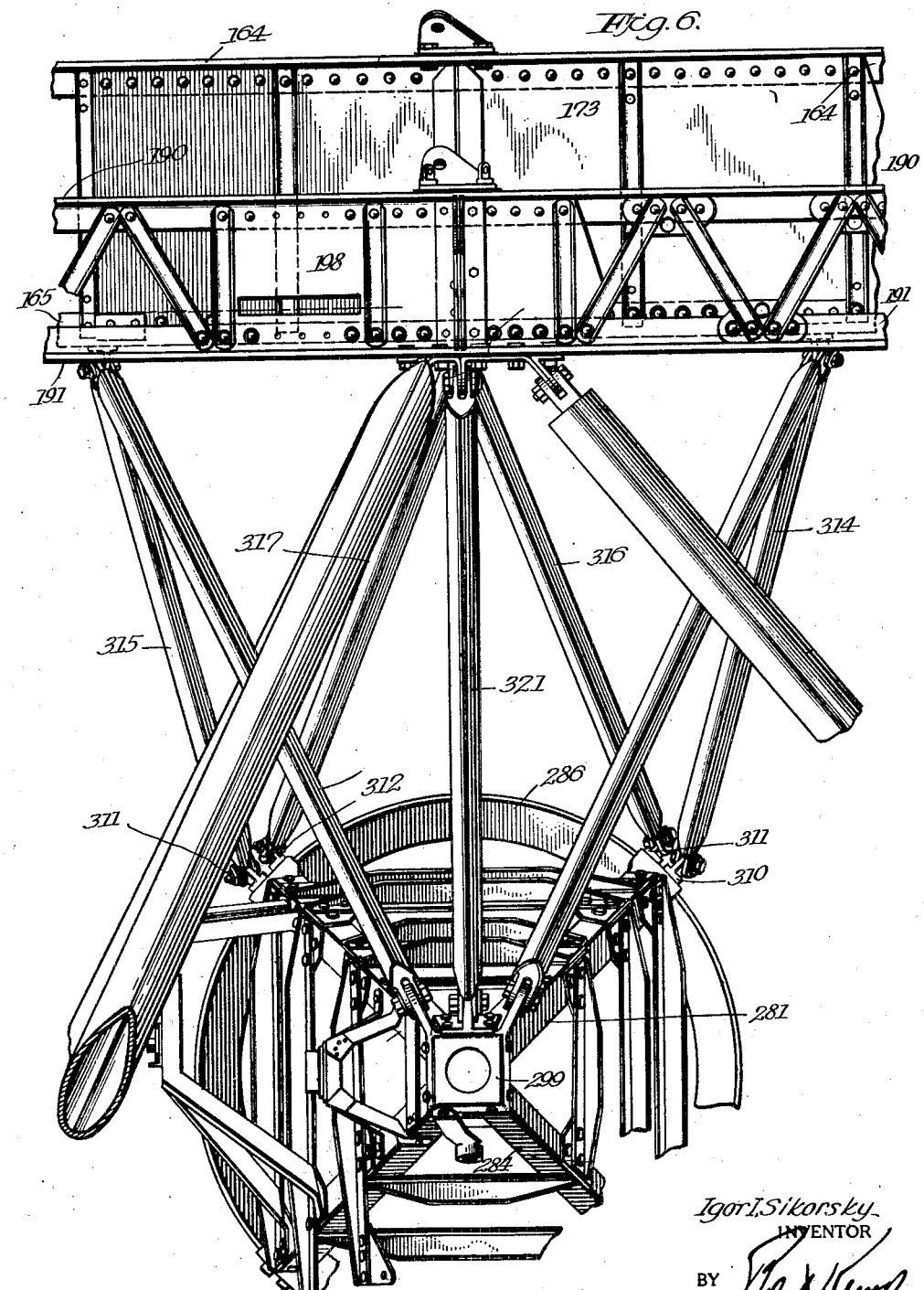

Patented Mar. 8, 1932

1,848,390

UNITED STATES PATENT OFFICE

IGOR I. SIKORSKY, OF LORDSHIP, CONNECTICUT, ASSIGNOR TO SIKORSKY AVIATION CORPORATION, OF WILMINGTON, DELAWARE, A CORPORATION OF DELAWARE

AIRCRAFT WING CONSTRUCTION

Original application filed June 7, 1929, Serial No. 369,113. Divided and this application filed August 12, 1929. Serial No. 385,222.

The present invention relates to improvements in aircraft, and particularly to the construction of the main plane of an amphibian.

This application is a division of an earlier case Serial No. 369,113, filed June 7, 1929 and relates to the construction of the center section of the main supporting plane of an amphibian.

In the accompanying drawings:

Figure 1 is a plan of an amphibian including an embodiment of the present invention.

Figure 2 is a front elevation.

Figure 3 is a side view.

Figure 4 is a vertical section, on an enlarged scale, through the center section of the main plane, showing an engine supporting frame suspended therefrom.

Figure 5 is a plan of parts shown in Figure 4.

Figure 6 is a rear elevation of parts shown in Figure 4.

Referring to the drawings, in the several views of which like parts are designated by the same reference character, the amphibian illustrated includes a body-boat 100 which is supported beneath the center section of a main plane.

As shown, the main plane comprises left and right wings, respectively, designated 101, 102 and a center section 103 from which the engines 146, 147 are suspended.

The machine also includes lower wings 104, 105 which project laterally from the body-boat 100, and said wings are connected with the main plane by a suitable truss structure including members 106, 107, 108 and 109.

Outriggers 116, 117 project rearward of the main plane center section 103, and support at their rear ends an empennage assembly 118, the rear portions of the outriggers being supported from the rear extremity of the body-boat by struts as indicated at 120.

The center section 103 of the main plane includes front and rear spars 155, 156, which are connected at spaced intervals by compression members 158.

The front spar includes top and bottom members 164, 165 of T-form in cross section, said members being connected by truss members, and the rear spar includes similar members 190, 191. To the front and rear spars are secured upper and lower contour members 224 and 225, which are connected at their forward ends by a nose plate 218 and are also suitably connected, as is usual, at their rear ends, not shown.

The upper and lower contour strips are connected by suitable angle iron truss members 228 and the compression members 158 include top and bottom angle iron members that extend from the front spar to the rear spar, and are connected and braced by truss members as shown in Figure 4.

In the embodiment of the invention illustrated, two engines 146, 147 are provided, these being arranged on opposite sides of the body-boat 100 and suspended from the front and rear spars of the center section 103 of the main plane.

Above each engine, said spars are, respectively, reinformed by vertically extending plates 173 and 198, the attachment of the engine supporting frame with the plane being directly beneath these reinforced sections of said spars.

In addition to being connected by the compression members 158, the top members of the front and rear spars are connected by strengthening bars 256.

The engine supporting frame is formed of four angle iron members 281, 282, 283 and 284 arranged in pyramidal shape, said members being connected at their forward end by a motor ring 286, and at their converging, rear ends to a box like member 299.

The ring 286 at the forward end of the engine frame is provided with radially projecting eye bolts 310, 311, 312 and 313. The bolts 310 and 313 are connected to the lower ends of suspension rods 314, 315, the upper ends of which are connected to the reinforced section of the front spar 155 of the center section 103 of the main plane. The eye bolts 311 and 312 on the engine supporting ring 286 are connected to the lower ends of suspension rods 316 and 317, and the upper ends of these suspension rods are also connected to the reinforced section of the front spart 155 at points between the ears 181 and 182 on said spar to which the suspension rods 314, 315 are attached.

I claim:

1. In an amphibian, a main plane section including front and rear spars each comprising upper and lower bars and interconnecting truss members, a localized portion of each spar being specially reinforced, an engine supporting frame of substantially pyramidal form, and suspension means in the form of a W connecting said frame at said reinforced portion with the reinforced portions of said spars.

2. In an amphibian, a main plane section including front and rear spars, the front spar comprising upper and lower bars and interconnecting truss members, and having a localized portion thereof reinforced by vertically extending plates connecting the upper and lower bars, an engine frame extending beneath said front spar, and suspension means in the form of double and single V's connecting both the forward and rear ends respectively of said frame with the localized reinforced portion of said front spar.

3. In an amphibian, a main plane section including front and rear spars each comprising upper and lower bars and interconnecting truss members, localized portions of each of said spars being specially reinforced, an engine frame of substantially pyramidal form, connections in the form of a W and a V between each end respectively of the engine frame and the reinforced portion of the front spar, and an additional connection between the rear end of the engine frame and the rear spar at said localized reinforced portion.

4. In an amphibian, a main plane section including front and rear spars, each comprising upper and lower bars and interconnecting truss members, compression members extending between and connected to the front and rear spars, and an engine frame suspended from said front spar by suspension means forming a W.

5. In an amphibian, a main plane section including front and rear spars, each comprising upper and lower bars with interconnecting truss members, truss compression members connected to the spars and contour members extending over and under said compression members and forward and rearward therefrom, a nose piece connecting the forward edges of said contour members, and an engine frame suspended by struts forming a W from said front spar and extending forward of the front spar.

Signed at College Point, Long Island City, in the county of Queens and State of New York, this 24th day of June, A. D. 1929.

IGOR I. SIKORSKY.